US006952828B2

(12) United States Patent
Greene

(10) Patent No.: US 6,952,828 B2
(45) Date of Patent: Oct. 4, 2005

(54) SYSTEM, METHOD AND COMPUTER PROGRAM PRODUCT FOR DYNAMIC RESOURCE MANAGEMENT

(75) Inventor: Scott R. Greene, Defiance, MO (US)

(73) Assignee: The Boeing Company, Seattle, WA (US)

( * ) Notice: Subject to any disclaimer, the term of this patent is extended or adjusted under 35 U.S.C. 154(b) by 851 days.

(21) Appl. No.: 09/964,045

(22) Filed: Sep. 26, 2001

(65) Prior Publication Data

US 2003/0061261 A1 Mar. 27, 2003

(51) Int. Cl.[7] .............................. G06F 9/46; G06F 17/60
(52) U.S. Cl. ................................ 718/104; 705/8; 705/9
(58) Field of Search ............................ 718/104; 705/8, 705/9

(56) References Cited

U.S. PATENT DOCUMENTS

| | | | |
|---|---|---|---|
| 5,369,570 A | | 11/1994 | Parad |
| 5,682,530 A | * | 10/1997 | Shimamura .................. 718/104 |
| 5,701,439 A | | 12/1997 | James et al. |
| 5,889,956 A | * | 3/1999 | Hauser et al. .............. 709/226 |
| 5,890,134 A | | 3/1999 | Fox |
| 6,333,936 B1 | * | 12/2001 | Johansson et al. .......... 370/449 |
| 6,351,734 B1 | * | 2/2002 | Lautzenheiser et al. ........ 705/8 |

OTHER PUBLICATIONS

Leonard, David C. "Understanding and managing conflict in a technical communication department." Technical Communication. Feb. 1993.*

Matthews, Linda M. et al. "Goal selection in a stimulated managerial environment." Group & Organization Management. Dec. 1994.*

*Aircraft Maintenance Event Scheduler (AMES)—Products;* Ω *mega Airlines Software*; pp. 1–3; <http://www.omegaair.com/products.htm> (visited Aug. 27, 2001).

Philippe Marquis; *Maintenance scheduler; Maintenance scheduler software*; pp. 1–3; <http://perso.easynet.fr/~philimar/mtschedu.htm> (visited Aug. 27, 2001).

* cited by examiner

*Primary Examiner*—Lewis A. Bullock, Jr.
(74) *Attorney, Agent, or Firm*—Alston & Bird LLP

(57) ABSTRACT

A system for dynamically managing the resources of a hierarchical organization includes an organizing processing element, at least one resource and a monitoring processing element. The organizing processing element capable of creating a maintenance plan comprising at least one task. Additionally, the organizing processing element can schedule performance of the tasks of the maintenance plan. The resources are capable of acting on the at least one task of the maintenance plan at the level $L_i$ to thereby perform the at least one task. And the monitoring processing element is capable of monitoring the performance of the at least one task at least partially based upon a status of the at least one task. And, if necessary, based on the monitoring, the organizing processing element is capable of soliciting available resources from said organizing processing element at a higher level of the hierarchical organization.

10 Claims, 4 Drawing Sheets

SYSTEM, METHOD AND COMPUTER PROGRAM PRODUCT FOR DYNAMIC RESOURCE MANAGEMENT

FIELD OF THE INVENTION

The present invention relates to systems and methods for managing the resources of an organization and, more particularly, relates to systems, methods and computer program products for dynamically managing the resources of a hierarchical organization.

BACKGROUND OF THE INVENTION

In many industries, planning for equipment and product maintenance currently involves the manual collection of data from a number of disparate sources and requires the analysis of the maintenance requirements of the equipment and/or product by those with relevant knowledge of the equipment and/or product to thereby identify resource requirements and schedule maintenance at a high level within an enterprise. Most of the data sources for maintenance planning exist in paper form and some are semi-automated. During times of high tempo operations, however, little or no time exists for the orderly collection and evaluation of problem data and the planning process becomes a response to individual equipment/product needs for its immediate use.

As equipment and product support requirements evolve over time, the enterprise must make the optimum use of scarce support resources. For example, in the aircraft industry, in times of war, as the military's operational resources (e.g., aircraft) degrade, the support system will be called upon to direct limited theater support assets to the site of specific aircraft where the most operational benefit will be realized. In this regard, the support system, including individual aircraft maintenance planning, must evolve with the aircraft it is supporting.

SUMMARY OF THE INVENTION

In light of the foregoing background, the present invention provides systems, methods and computer program products for dynamically managing the resources of a hierarchical organization. The present invention allows for the automatic collection and evaluation of data from a number of disparate sources. Additionally, the present invention allows for resource allocation and reallocation among different levels of the hierarchical organization based on the priority of the maintenance task, without requiring an unnecessarily long amount of time. This is especially important, as stated above, during times of high tempo operations where little or no time exists for the orderly collection and evaluation of problem data.

According to one embodiment, the present invention provides a system for dynamically managing the resources of a hierarchical organization, where the hierarchical organization comprises n levels $L_1 \ldots L_n$ with n being a positive integer. According to the hierarchical organization, for at least i>1, each level $L_i$ comprises a plurality of members, where the members of level $L_{i-1}$ include groupings of the members of level $L_i$, At each level of the organization, the system includes an organizing processing element, at least one resource and a monitoring processing element. The organizing processing element is capable of creating a maintenance plan comprising at least one task. Further, the organizing processing element is capable of scheduling performance of the tasks of the maintenance plan, where the maintenance plan includes an associated predetermined threshold time for maintenance plan completion.

The resources of the system are capable of acting on the tasks of the maintenance plan at the level $L_i$ to thereby perform the tasks. In this regard, the organizing processing element is capable of scheduling the resources to act on the tasks to thereby schedule performance of the tasks. The monitoring processing element is then capable of monitoring performance of the tasks at least partially based upon a status of the tasks. In this regard, in another embodiment, at each level the system further includes at least one indicator capable of indicating the status of the at least one task of the maintenance plan.

Based upon monitoring the tasks, the monitoring processing element is capable of determining an amount of time required to perform the tasks thereafter projecting a completion time associated with the maintenance plan. From the projected completion time, the monitoring processing element is capable of comparing the projected completion time to the predetermined threshold time associated with the maintenance plan to determine whether the projected completion time is greater than the predetermined threshold time. If the projected completion time is greater than the predetermined threshold time, the monitoring processing element is capable of communicating with the organizing processing element to determine whether performance of the other tasks of the maintenance plan can be rescheduled such that the maintenance plan can be completed within the predetermined threshold time.

If the at least one resource cannot be rescheduled, the organizing processing element is capable of soliciting available resources from the organizing processing element at a higher level $L_{i+1}$. In this regard, the organizing processing element at level $L_{i+1}$ is capable of communicating available resources to allocate from level $L_{i+1}$ to level $L_i$. Based on the communication of available resources, the organizing processing element at level $L_i$ is capable of rescheduling at least one resource at level $L_i$ to include the available resources allocated from level $L_{i+1}$.

In one embodiment, the organizing processing element at level $L_i$ is capable of soliciting available resources from level $L_{x+1}$, where x=i. If no resources are available to allocate from level $L_{x+1}$, the soliciting repeatedly continues at the organizing processing element of level $L_x$ for x=x+1 until either all the levels have been solicited (x=n) or until a level $L_x$ has available resources. The organizing processing element at level $L_{x+1}$ is then capable of communicating available resources to allocate from level $L_{x+1}$ to level $L_x$. Communicating the available resources repeatedly continues for x=x−1 until x=i and the original soliciting level receives available resources. In another embodiment, if no resources are available from any of the levels of the hierarchical organization, the organizing processing element is further capable of recreating the maintenance plan to reduce a demand on the at least one resource to perform the tasks such that the projected completion time for the maintenance plan is no greater than the predetermined threshold time.

In operation, a method of dynamically managing the resources of a hierarchical organization creates a maintenance plan comprising at least one task at each level $L_1 \ldots L_n$. For at least i>1 the tasks at leach level $L_i$ at least partially include groupings of the tasks of level $L_{i-1}$. Performance of the tasks by the resource is then scheduled, where the resources act on at least a portion of the tasks to thereby perform the tasks. The tasks at the level $L_i$ are then performed and, as the tasks are performed, the performance of the tasks is monitored to determine an amount of time required to perform the task. Then, a completion time associated with the maintenance plan is projected and compared to the predetermined threshold time associated with the maintenance plan.

When the projected completion time is no greater than the predetermined threshold time another task of the maintenance plan is performed, monitored and compared at the level $L_i$ until the each of the tasks of the maintenance plan has been performed. But if the projected completion time is greater than the predetermined threshold time, a determination is made as to whether performance of the other tasks of the maintenance plan can be rescheduled such that the maintenance plan can be completed within the predetermined threshold time.

If resources cannot be rescheduled to execute the other tasks of the maintenance plan within the predetermined threshold time, additional resources from a higher level $L_{i+1}$ are solicited. Available resources are then allocated to level $L_i$ and thereafter the resources are rescheduled at level $L_i$ to include the available resources allocated from level $L_{i+1}$. In another embodiment, available resources are solicited from level $L_{x+1}$, where x=i. In this embodiment, the soliciting repeatedly continues for x=x+1 until at least one of x=n and a level $L_x$ having resources available to allocate is discovered. Then, available resources are allocated to level $L_x$ from level $L_{x+1}$, wherein allocating repeatedly continues for x=x−1 until x=i. If no resources are available to allocate, the maintenance plan is recreated to reduce a demand on the resources to perform the tasks, where the demand is reduced such that the projected completion time is no greater than the predetermined threshold time.

The present invention therefore provides systems, methods and computer program products for dynamically managing the resources of a hierarchical organization. In this regard, the present invention provides for monitoring performance of a maintenance plan based on a status of the tasks of the maintenance plan, which allows for the automatic collection of data from a number of disparate sources. Additionally, the present invention allows for resource reallocation among different levels of the hierarchical organization based on the priority of the work to be performed without requiring an unnecessarily long amount of time.

BRIEF DESCRIPTION OF THE DRAWINGS

Figure 1:
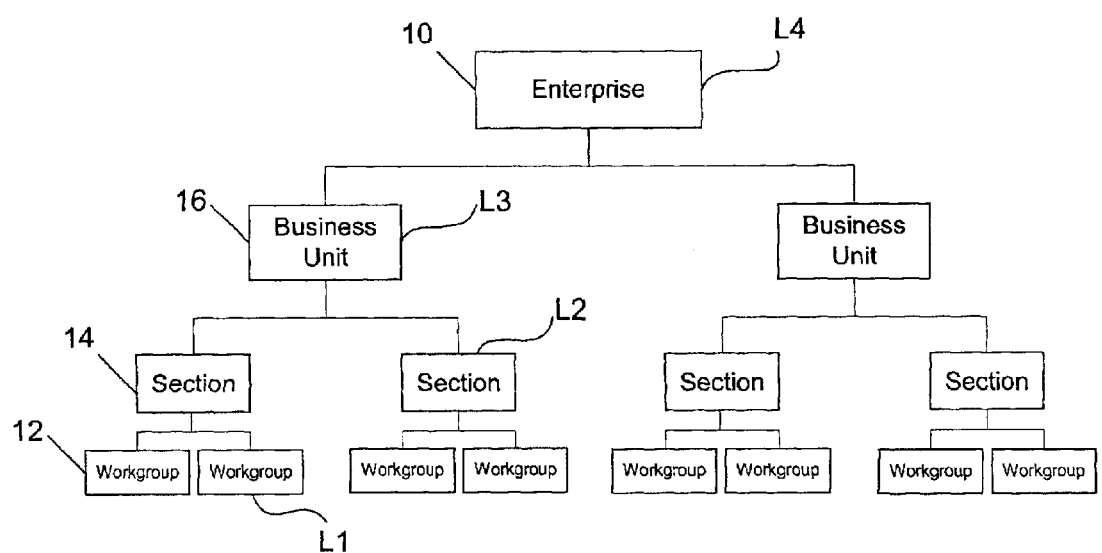
Figure 2:
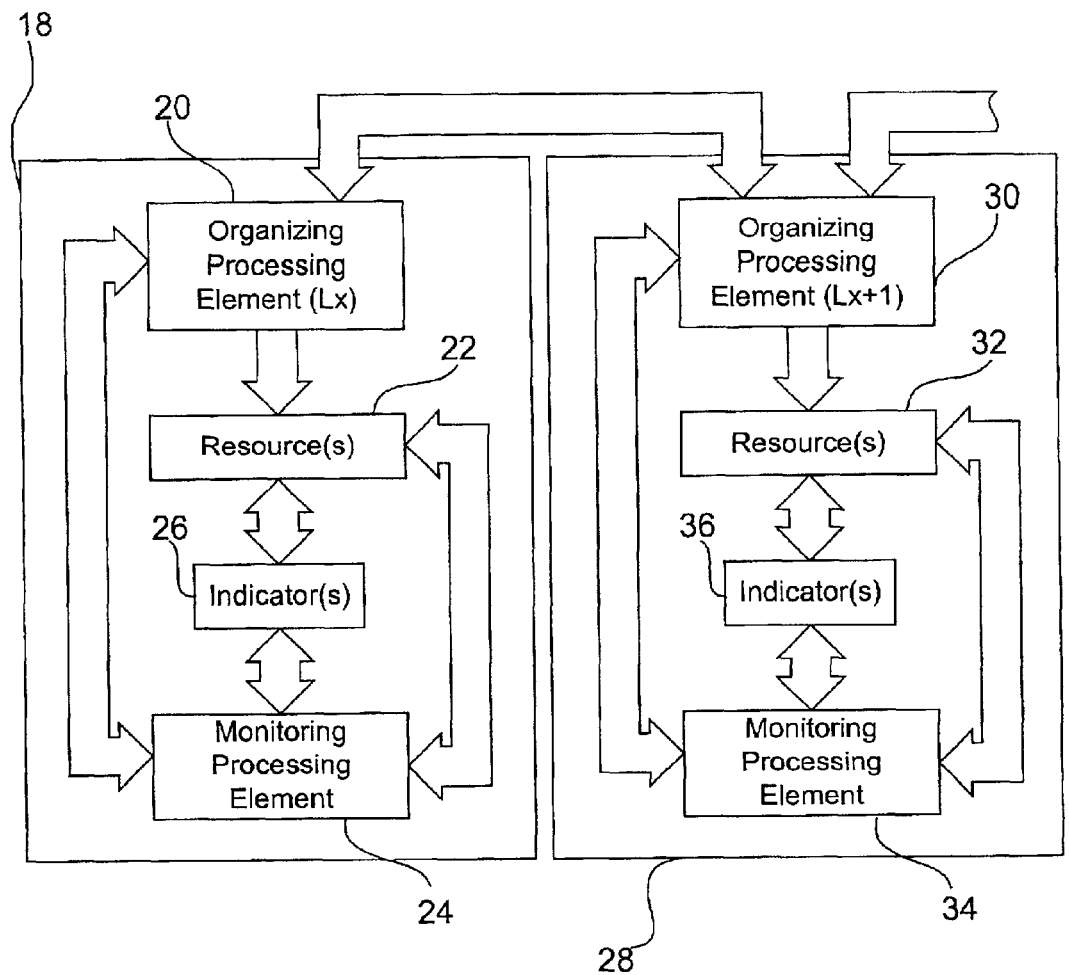
Figure 3A:
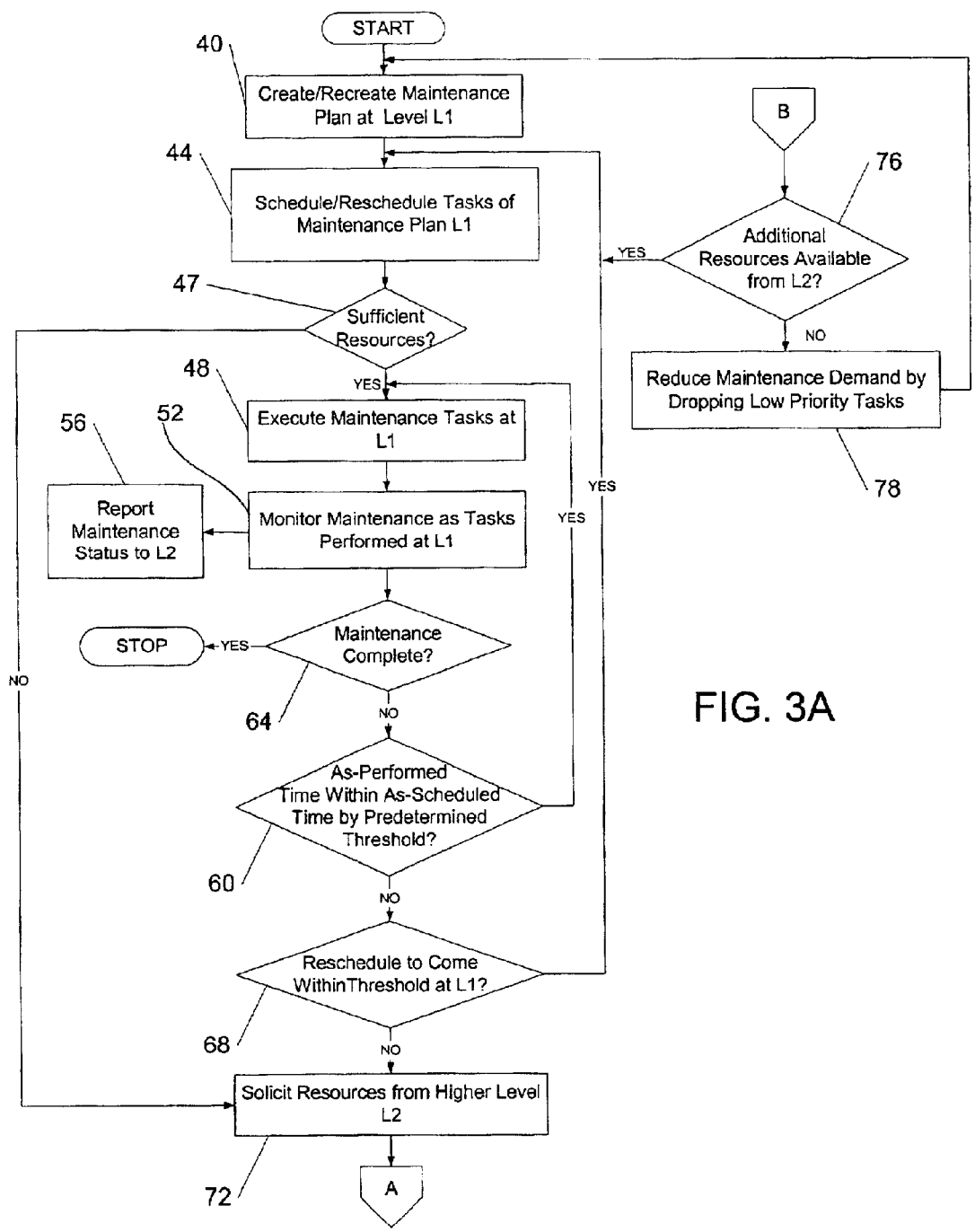
Figure 3B:
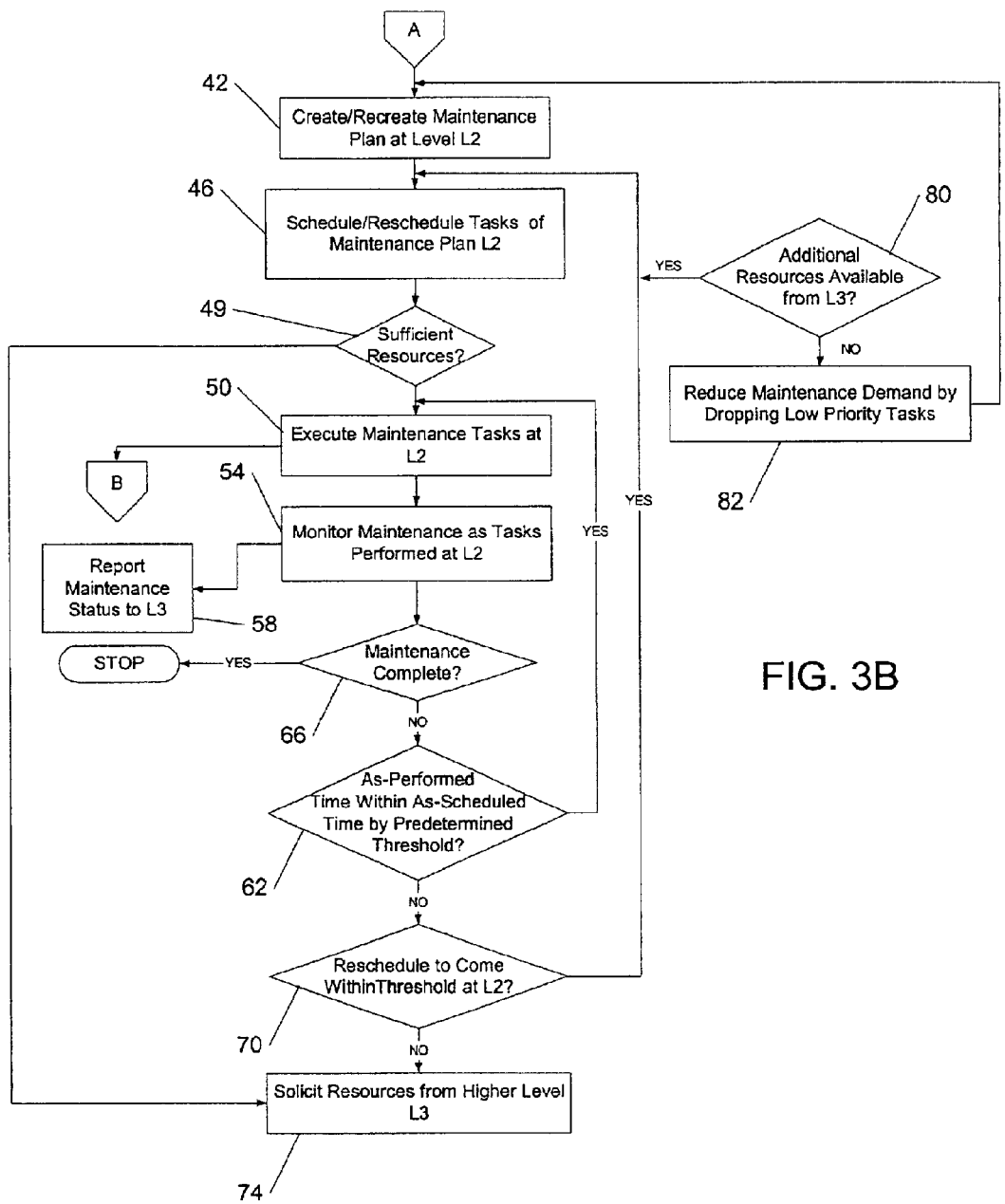

Having thus described the invention in general terms, reference will now be made to the accompanying drawings, which are not necessarily drawn to scale, and wherein:

FIG. 1 is a schematic diagram illustrating a hierarchical organization that would benefit from one embodiment of the present invention;

FIG. 2 is a block diagram illustrating two dynamic resource managers for two levels of a hierarchical organization, according to one embodiment of the present invention; and FIGS. 3A and 3B are flow diagrams illustrating various steps in a method of managing the resources of a hierarchical organization, highlighting two levels of the organization, according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, a hierarchical organization 10 that would benefit from the system and method of the present invention is illustrated. The organization consists of n levels $L_1 \ldots L_n$, with n being a positive integer. In the hierarchical organization, each level above the first level generally comprises a plurality of members, with the members of the level being groups of the members of the level below. For example, the organization illustrated in FIG. 1 consists of four levels, $L_1 \ldots L_4$. As illustrated, the level 4 enterprise includes workgroups 12 at level $L_1$, sections 14 at level $L_2$ and business units 16 at level $L_3$. The business units at level $L_3$ are groups of the respective sections at level $L_2$. And the sections at level $L_2$ are groups of the work groups at level $L_1$. In the military, for example, the first level might comprise workgroups, with the second level including squadrons comprising a plurality of workgroups. The third level could comprise wings made up of a plurality of squadrons, and a fourth level could include a theater made up of a plurality of wings. As evident, the number of levels in the organization depends upon the organization. Therefore, it should be understood that the systems, methods and computer program products of the present invention can be employed by organizations with any of a number of hierarchical levels.

Now referring to FIG. 2, a system for dynamically managing the resources of a hierarchical organization 10 includes at each level an organizing processing element, at least one resource and a monitoring processing element. Additionally, the system preferably includes at each level at least one indicator. Collectively, the organizing processing element, resources, monitoring processing element and indicators of an individual level will herein be referred to as a dynamic resource manager of the respective level. In this regard, as illustrated, the dynamic resource manager 18 of level $L_1$ includes organizing processing element 20, resources 22, monitoring processing element 24 and indicators 26. Additionally, as also illustrated, the dynamic resource manager 28 of level $L_2$ includes organizing processing element 30, resources 32, monitoring processing element 34 and indicators 36. Although only two dynamic resource managers are illustrated in FIG. 2, it should be understood that the system can include any of a number of dynamic resource managers, typically including one dynamic resource manager for each member of each hierarchical level of the organization. Thus, for an organization with n levels and where k(n) is the number of members of level n, the system would preferably include $\Sigma_1^n k(n)$ dynamic resource managers.

Turning attention now to the dynamic resource manager 18 of level $L_1$ illustrated in FIG. 2, organizing processing element 20 is capable of creating a maintenance plan for the level. The maintenance plan consists of at least one task and has an associated predetermined threshold time, such as an aggregation of a predetermined duration for each of the tasks of the maintenance plan. Each task is assigned a priority within the maintenance plan based on its value with respect to the operational requirements of an item being maintained and the value of the task within the maintenance plan. In this regard, each task can have an associated priority weight based upon a number of different factors, such as the cost associated with performing the task and the time involved in training human resources to perform the task. As described below, this priority can influence the scheduling process and thus resource allocations and, in the end, decisions to perform or defer the task.

The organizing processing element is also capable of scheduling performance of the tasks of the maintenance plan. The organizing processing element can comprise any of a number of devices, such as a personal computer or other high level processor operating under control of a computer program. In this regard, in a preferred embodiment, the organizing processing element comprises a personal computer or other high level processor operating according to a method such as that disclosed in U.S. Pat. No. 5,890,134 issued Mar. 30, 1999 to Fox and assigned to McDonnell Douglas Corporation, the contents of which is hereby incorporated by reference in its entirety.

The dynamic resource manager 18 of level $L_1$ further includes at least one resource 22, preferably a plurality of resources, capable of acting on the tasks of the maintenance plan to thereby perform the tasks. In this regard, the organizing processing element 20 is capable of scheduling the resources to act on the tasks. The number and kind of resources can vary depending on the nature and complexity of the maintenance plan, but can include such things as supporting equipment, tools, and human resource skills.

To help ensure the resources perform the tasks of the maintenance plan within the predetermined threshold time, the dynamic resource manager 18 of level $L_1$ includes the monitoring processing element 24. The monitoring processing element is capable of monitoring the performance of the tasks to determine whether the maintenance plan will be completed within the predetermined threshold time. And if the monitoring processing element determines that, under the current schedule determined by the organizing processing element 20, the maintenance plan will not be complete within the threshold time, the monitoring processing element is capable of initiating communications to dynamically shift resources to the tasks of the maintenance plan such that the maintenance plan can get back on schedule to be completed within the threshold time. The monitoring processing element can comprise any of a number of different devices, such as a personal computer or other high level processor. Additionally, whereas the monitoring processing element and organizing processing element 20 are depicted and described as comprising two different devices, each element can be included within a single device, such as a personal computer, without departing from the spirit and scope of the present invention.

To determine whether the maintenance plan will be completed within the threshold time, the monitoring processing element 24 receives feedback as to the status of the maintenance plan. Any of a number of sources can provide feedback to the monitoring processing element, including the resources 22. But in a preferred embodiment, indicators 26 provide feedback to the monitoring processing element. The indicators can comprise any number of different devices, such as testing devices used during performance of the maintenance plan. Indicators can also comprise automated components within objects maintained according to the maintenance plan. For example, in the aircraft industry, an indicator can comprise completion of execution of an onboard maintenance program within an aircraft being maintained according to the maintenance plan. Additionally, an indicator can comprise a location within electronic documentation being accessed by resources, such as human resources, during the execution of the maintenance task. In this regard, the feedback can comprise an indication that an electronic document relevant to an object has been accessed. And based upon the indication, the monitoring processing element can infer that a task including acting on the object is being performed.

Referring now to FIGS. 3A and 3B, a method for managing the resources of the hierarchical organization 10 begins by creating the maintenance plan at each level, such as in the organizing processing element. Blocks 40 and 42. In this regard, to simplify explanation, the method will only be described with respect to two levels, $L_1$ and $L_2$. As stated before, however, it should be understood that the present invention can be employed by an organization 10 with any number of levels without departing from the spirit and scope of the present invention. As each level can comprise groups of the level below it, the level of the tasks can similarly be groups of tasks performed at the level below it. For example, in maintaining a squadron of aircraft, a workgroup at level $L_1$ may have a maintenance plan comprising maintaining an individual aircraft. The squadron level, on the other hand, may include a maintenance plan comprising maintaining all aircraft assigned to the squadron. In this regard, the level of the maintenance plan increases as the level within the organization performing the maintenance plan increases. As such, level $L_1$ of an n level organization would typically include a maintenance plan with the most low level tasks, while the highest level $L_n$ would typically include a maintenance plan with the most high level tasks.

Once the maintenance plan has been created, the tasks of the maintenance plan are scheduled and resources are assigned to the tasks. Blocks 44 and 46. In this regard, in the preferred embodiment utilizing a method similar to that disclosed by the Fox '134 patent, the organizing processing element 20 (i.e., scheduling program) is started and thereafter calls for the entry of task data. Each task entered into the organizing processing element for the maintenance plan (i.e., project) can include information on the identification of the task such as "remove ejection seat", task duration, the required resources, and the precedent constraints applicable to the task. As an example, one constraint may be that a certain task must be performed before another, a precedent constraint, such as, in the repair of an aircraft, the canopy must be opened prior to removal of the ejection seat. Thus before the ejection seat removal task can start, the scheduling program must look to determine whether the aircraft canopy open task is scheduled for completion prior to the start of the ejection seat removal task.

The inventory of resources available to act on the tasks, in kind and quantity, are maintained in the organizing processing element 20. The data on resources enables the organizing processing element to allocate resources to the various tasks of the maintenance plan. In the event that a the available resources are insufficient in quantity or type to allow accomplishment of all tasks simultaneously, as is typically the situation, in preparing the schedule the organizing processing element schedules the number of such resources as are available amongst the various tasks requiring the resource, in some preferred heuristic order according to the methods utilized by the organizing processing element to schedule the tasks. The organizing processing element also ensures that the time allocations assigned to such resource for a task does not conflict with another task. That is, the resource is assigned to tasks without violating a resource constraint. For a resource that can only be utilized by a single task at a time, the organizing processing element ensures that the resource is only assigned to one task at a time.

To create the schedule, the organizing processing element 20 can set right and left time boundaries that designate the threshold time of the maintenance plan. Thereafter, the organizing processing element can sequentially left time shift and right time shift respective chronologically sorted completion time and starting time task listings in order to balance the allocation of resources subject to the various constraints imposed upon the resources by the task definitions. As the present invention does not focus on the scheduling of the maintenance plans, a more detailed explanation of the scheduling method will not be provided herein. Further details of such method of scheduling the tasks of the maintenance plan are provided in the Fox '134 patent. Once the tasks of the maintenance plan have been scheduled at each level, the organizing processing element determines whether sufficient resources are available to complete the tasks of the maintenance plan within the predetermined threshold time. Blocks 47 and 49.

If sufficient resources are not available to schedule the tasks such that the maintenance plan can be completed within the threshold time, the organizing processing element organizing processing element 20 communicates with the organizing processing element 30 of the next higher level to thereby solicit additional resources from the higher level. Blocks 72 and 74. For example, if the organizing processing element of level $L_1$ determined the tasks of the maintenance plan could not be completed in the threshold time as desired, the organizing processing element of $L_1$ would communicate with the organizing processing element of level $L_2$ to thereby solicit additional resources from level $L_2$. The resource solicitation will include the priority and nature of the tasks requiring additional resources as well as definition of the resource type being requested. Once solicited, the organizing processing element from the higher level will attempt to replan the maintenance plan and thereafter reschedule the higher level maintenance plan to account for tasks from the lower level requiring additional resources. Blocks 42 and 46. In this regard, a method such as that disclosed by the Fox '134 patent can be implemented to replan and reschedule the maintenance plan of the higher level to accommodate tasks at the lower level. For example, if a maintenance plan at level $L_2$ contains a schedule for four weeks worth of tasks, and desires to be able to accommodate at least a portion of tasks from level $L_1$ in the second week without perturbing the schedule for the first, third, or fourth week, the organizing processing element of level $L_2$ can set the left boundary to be the start time of the second week and the right boundary to be the end time of the second week and apply the shift right/left operations. The organizing processing element can thus open up a "hole" at a designated point in the existing schedule at level $L_2$. The organizing processing element can reschedule and reallocate resources under the higher processing element's purview, which were previously allocated to another lower level dynamic resource manager but are tasked with lower priority work. Once the tasks at the higher level have been rescheduled, the resulting resource allocations are communicated to the affected lower level dynamic resource managers. As stated before, the level of the tasks can similarly be groups of tasks performed at the level below it. As such, the resources allocated to the lower level can come from any one of a number of sources, including another group at the same level as the soliciting level. For example, in maintaining a squadron of aircraft at level $L_2$, one workgroup at level $L_1$ may have requested resources from the squadron at level $L_2$. To supply the resources to the soliciting workgroup at level $L_1$, the organizing processing element at level $L_2$ may allocate resources from another workgroup at level $L_1$ to the soliciting workgroup.

With the allocated resources from the higher level, the organizing processing element 30 of the higher level communicates the allocated resources to the lower level organizing processing element 20, which then plans and reschedules the tasks of the lower level to include the new resource allocations. If the higher level cannot replan and/or reschedule the maintenance plan and/or tasks to accommodate tasks from the lower level, the organizing processing element 20 can reduce the maintenance demand on the resources at the lower level by deferring or removing lower priority tasks from the schedule of the lower level maintenance plan. Blocks 76–82.

In an alternative embodiment, the higher level organizing processing element 30 will replan and/or reschedule the maintenance plan and/or tasks to accommodate tasks from the lower level even if the higher level cannot spare the solicited resources. In such an instance, the higher level organizing processing element will proceed through steps similar to the lower level by soliciting resources from the next higher level. In this regard, consider a hierarchical organization 10 with n levels, and a lower level of i. In such an organization, the organizing processing element of level $L_i$ would solicit available resources from level $L_{x+1}$, where x=i. If adequate resources were not discovered at level $L_{x+1}$, the organizing processing elements at levels $L_{x+1}$ would repeatedly continue soliciting for x=x+1 until either the highest level has been solicited (x=n) or a level $L_x$ having resources available to allocate is discovered. Then, the resources would be allocated to level $L_x$ from level $L_{x+1}$, with the allocating repeatedly continuing for x=x-1 until x=i.

As an example, if level $L_1$ solicits resources from level $L_2$, the organizing processing element of level $L_2$ will replan/reschedule to accommodate the request from level $L_1$. Then, if the monitoring processing element of level $L_2$ determines that insufficient resources are available to schedule all tasks under its purview, (e.g., all $L_1$ workgroups) or that the scheduled time exceeds the predetermined threshold time of level $L_2$, the organizing processing element of level $L_2$ may defer or remove the lowest priority tasks or communicate with the organizing processing element of level $L_3$ to thereby solicit resources from level $L_3$. In this regard, resources are allocated to the original soliciting level, and a chain reaction proceeds through the hierarchical organization 10 until all of the levels solicited for resources have adequate resources to perform the level's respective maintenance plan after allocating resources.

If sufficient resources are available, or after resources have been allocated, the tasks are performed by the resources 22 as scheduled by organizing processing element 20. Blocks 48 and 50. As the tasks are performed, the monitoring processing element 24 monitors the status of the tasks to thereby monitor the performance of the tasks. Blocks 52 and 54. In this regard, the monitoring processing element can provide the status to the next higher level, such as the monitoring processing element of level $L_1$ reporting the status to the monitoring processing element of level $L_2$. Blocks 56 and 58. As stated, the status can be provided to the monitoring processing element in any one of a number of manners, including by the resources and/or the indicators 26, such as an object being maintained and/or the accessing of an electronic document.

Based at least partially upon the status of the tasks, the monitoring processing element 24 can determine an as-performed time for the maintenance plan and project a completion time for the plan. The projected completion time is generally the as-performed time for the current status of the maintenance plan summed with the scheduled duration of the remaining tasks to be performed. For example, assume a maintenance plan is scheduled to take five days, with one task scheduled for each day. If the first task actually requires a day and a half to complete, the monitoring processing element may project a completion time of five and one-half days for maintenance plan completion. Once the projected completion time is determined, the monitoring processing element compares the projected completion time to the predetermined threshold time for the maintenance plan to determine whether the maintenance plan will be complete within the threshold time if the remaining tasks are performed as scheduled. Blocks 60 and 62. If the projected completion time is within the threshold time, the scheduled tasks of the maintenance plan continue to be performed and monitored, and an as-performed time repeatedly determined and compared to the threshold time, until the maintenance plan is complete. Blocks 64 and 66.

If, at anytime during the performance of maintenance, the projected completion time is exceeds the threshold time, the monitoring processing element 24 communicates with the organizing processing element 20 to determine whether the other tasks can be rescheduled such that the maintenance plan can be completed within the threshold time. Blocks 68 and 70. In this regard, the organizing processing element can determine whether the schedule can be recreated for the number of tasks remaining and the time remaining. Alternatively, the organizing processing element can determine whether any resources can be transferred from one task to another to thereby provide more resources to the remaining tasks to thereby speed up performance of the remaining tasks. In this regard, a method such as that disclosed by the Fox '134 patent can be applied to the schedule to determine whether the schedule can be recreated within the required threshold time.

For example, the organizing processing element 20 can attempt to improve the cycle time for a subset of the tasks on the schedule by setting the left and right boundaries in accordance with the desired cycle time, e.g., separating the left and right boundaries by two days in order to define the cycle time to be two days, and then applying the shifting operations only to the subset of tasks of interest. For example, in the aircraft industry, level $L_2$ may be responsible for the maintenance of all squadron aircraft with the maintenance of each aircraft being a respective member of the level. If the aircraft are at various stages of completion, one may desire to accelerate the tasks associated with the aircraft that is furthest from completion without altering the schedule for the tasks associated with the other aircraft so that all of the aircraft can be completed by the desired completion date. To accelerate the remaining tasks associated with the aircraft that is furthest from completion, the remaining tasks are right shifted, i.e., moved forward in time, as much as possible subject to the constraints to which the respective tasks are subject. The tasks remaining to be performed for the other aircraft are typically left undisturbed so that the maintenance of the aircraft that is furthest from completion is effectively accelerated relative to the production of the other aircraft. Alternatively, the tasks remaining to be performed for the other aircraft may be shifted, typically in a rightward direction in order to delay their performance, in order to make additional resources available for the performance of the remaining tasks associated with the aircraft that is furthest from completion, thereby effectively loosening the constraints otherwise imposed upon the aircraft that is furthest from completion. In either instance, the schedules are preferably arranged such that the maintenance of all of the aircraft is completed at the same or nearly the same time and in accordance with the desired completion schedule.

If the other tasks cannot be rescheduled such that the maintenance plan can be completed within the threshold time, in the same manner as when the organizing processing element 20 solicited resources to schedule the tasks within the predetermined threshold time, the organizing processing element 20 communicates with the organizing processing element 30 of the next higher level to thereby solicit additional resources from the higher level. Blocks 72 and 74. Once solicited, the organizing processing element from the higher level attempts to replan the maintenance plan and thereafter reschedule the tasks at the higher level to account for tasks from the lower level requiring additional resources. Blocks 42 and 46. Once the organizing processing element 30 reschedules the tasks within the maintenance plan at the higher level to accommodate the resource solicitation from the lower level, the resource allocations are communicated to the lower level organizing processing element 20.

The lower level organizing processing element 20, then reschedules the tasks of the lower level to include the new allocated resources. If the higher level cannot replan and/or reschedule the maintenance plan and/or tasks to accommodate tasks from the lower level, the organizing processing element 20 can reduce the maintenance demand on the resources at the lower level by deferring or removing lower priority tasks, that place demand on the capacity constraining resource, from the schedule of the lower level maintenance plan Blocks 76–82. In an alternative embodiment, the higher level organizing processing element 30 will replan and/or reschedule the maintenance plan and/or tasks to accommodate tasks from the lower level even if the higher level cannot spare the solicited resources. In such an instance, the higher level organizing processing element will proceed through steps similar to the lower level by soliciting resources from the next higher level, or deferring or removing lower priority tasks from the maintenance plan that place demand on the capacity constraining resource.

Therefore the systems, methods and computer program products of the present invention dynamically manages the resources of a hierarchical organization by monitoring performance of a maintenance plan based on a status of the tasks of the maintenance plan. The present invention also allows each level of the hierarchical organization to analyze the maintenance requirements of the equipment and/or product of the respective level regardless of the relevant knowledge of the equipment and/or product. Importantly, the present invention additionally allows for resource reallocation among different levels of the hierarchical organization based on knowledge of priority of maintenance to be performed without requiring an unnecessarily long amount of time.

In various advantageous embodiments, portions of the system and method of the present invention include a computer program product. The computer program product includes a computer-readable storage medium, such as the non-volatile storage medium, and computer-readable program code portions, such as a series of computer instructions, embodied in the computer-readable storage medium. Typically, the computer program is stored and executed by a processing unit or a related memory device, such as the organizing processing elements 20, 30 and/or monitoring processing elements 26, 34 as depicted in FIG. 2.

In this regard, FIGS. 1–3 are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method at least partially implemented on a computer for of dynamically managing the resources of a hierarchical organization, wherein the hierarchical organization comprises n levels $L_1 \ldots L_n$ with n being a positive integer, wherein for at least i>1 each level $L_i$ comprises a plurality of members, and wherein the members of level $L_{i-1}$ comprise groupings of the members of level $L_i$, said method comprising:

creating a maintenance plan comprising at least one task at each level $L_1 \ldots L_n$, wherein for at least i>1 the at least one task at leach level $L_i$ at least partially includes groupings of the at least one task of level $L_{i-1}$, and wherein the maintenance plan at each level includes an associated predetermined threshold time;

scheduling performance of the at least one task by at least one resource, wherein the at least one resource acts on at least a portion of the at least one task to thereby perform the at least one task;

performing one of the at least one task at the level $L_i$;

monitoring the performance of the at least one task to determine an amount of time required to perform the task performed and thereafter projecting a completion time associated with the maintenance plan;

comparing the projected completion time to the predetermined threshold time associated with the maintenance plan, wherein when the projected completion time is no greater than the predetermined threshold time another task of the maintenance plan is performed, monitored and compared at the level $L_i$ until the each of the at least one task of the maintenance plan has been performed;

determining whether performance of the other tasks of the maintenance plan can be rescheduled such that the maintenance plan can be completed within the predetermined threshold time, wherein determining occurs when the projected completion time is greater than the predetermined threshold time;

soliciting additional resources from a higher level $L_{i+1}$, wherein soliciting occurs when at least one resource cannot be rescheduled to execute the other tasks of the maintenance plan within the predetermined threshold time; and allocating additional resources to level $L_i$ and thereafter rescheduling the at least one resource at level $L_i$ to include the additional resources allocated from level $L_{i+1}$ to act on at least a portion of other of the at least one task to thereby perform the other of the at least one task.

2. A method according to claim 1, wherein soliciting comprises soliciting additional resources from level $L_{x+1}$, wherein x=i, wherein soliciting repeatedly continues for x=x+1 until at least one of x=n and a level $L_x$ having additional resources available to allocate is discovered, and wherein allocating comprises allocating additional resources to level $L_x$ from level $L_{x+1}$, wherein allocating repeatedly continues for x=x−1 until x=i.

3. A method according to claim 1 further comprising recreating the at least one maintenance plan to reduce a demand on the at least one resource to perform the at least one task, wherein recreating occurs when no additional resources are available to allocate, and wherein the demand is reduced such that the projected completion time is no greater than the predetermined threshold time.

4. A system for dynamically managing the resources of a hierarchical organization, wherein the hierarchical organization comprises n levels $L_1 \ldots L_n$ with n being a positive integer, wherein for at least i>1 each level $L_i$ comprises a plurality of members, and wherein the members of level $L_{i-1}$ comprise groupings of the members of level $L_i$, at each level said system comprising:

an organizing processing element capable of creating a maintenance plan comprising at least one task, wherein said organizing processing element is capable of scheduling performance of the at least one task of the maintenance plan, and wherein the maintenance plan includes an associated predetermined threshold time;

at least one resource capable of acting on the at least one task of the maintenance plan at the level $L_i$ to thereby perform the at least one task, wherein said organizing processing element is capable of scheduling the at least one resource to act on the at least one task to thereby schedule performance of the at least one task;

a monitoring processing element capable of monitoring the performance of the at least one task at least partially based upon a status of the at least one task, wherein said monitoring processing element is capable of determining an amount of time required to perform the at least one task and thereafter projecting a completion time associated with the maintenance plan, wherein said monitoring processing element is capable of comparing the projected completion time to the predetermined threshold time associated with the maintenance plan, wherein when the projected completion time is greater than the predetermined threshold time said monitoring processing element is capable of communicating with said organizing processing element to determine whether performance of the other tasks of the maintenance plan can be rescheduled such that the maintenance plan can be completed within the predetermined threshold time, wherein when the at least one resource cannot be rescheduled said organizing processing element is capable of soliciting additional resources from said organizing processing element at a higher level $L_{i+1}$, wherein said organizing processing element at level $L_{i+1}$ is capable of communicating additional resources to allocate from level $L_{i+1}$ to level $L_i$ to act on at least a portion of other of the at least one task to thereby perform the other of the at least one task, and wherein said organizing processing element at level $L_i$ is capable of rescheduling the at least one resource at level $L_i$ to include the additional resources allocated from level $L_{i+1}$.

5. A system according to claim 4, wherein each level of said system further comprises at least one indicator capable of indicating the status of the at least one task of the maintenance plan.

6. A system according to claim 4, wherein said organizing processing element at level $L_i$ is capable of soliciting additional resources from level $L_{x+1}$, wherein x=i, wherein when no additional resources are available to allocate from level $L_{x+1}$ the soliciting repeatedly continues at said organizing processing element of level $L_x$ for x=x+1 until at least one of x=n and a level $L_x$ has additional resources available to allocate, wherein organizing processing element at level $L_{x+1}$ is capable of communicating additional resources to allocate from level $L_{x+1}$ to level $L_x$, and wherein communicating additional resources repeatedly continues for x=x−1 until x=i.

7. A system according to claim 4, wherein said organizing processing element is further capable of recreating the maintenance plan to reduce a demand on the at least one resource to perform the at least one task such that the projected completion time is no greater than the predetermined threshold time.

8. A computer program product for dynamically managing the resources of a hierarchical organization, wherein the hierarchical organization comprises n levels $L_1 \ldots L_n$ with n being a positive integer, wherein for at least i>1 each level $L_i$ comprises a plurality of members, and wherein the members of level $L_{i-1}$ comprise groupings of the members of level $L_i$, the computer program product comprising a computer-readable storage medium having computer-readable program code embodied in said medium, the computer-readable program code comprising:

a first executable portion for creating a maintenance plan comprising at least one task at each level $L_1 \ldots L_n$, wherein for at least i>1 the at least one task at leach level $L_i$ at least partially includes groupings of the at least one task of level $L_{i-1}$, and wherein the maintenance plan at each level includes an associated predetermined threshold time;

a second executable portion for scheduling performance of the at least one task at each level by at least one resource, wherein the at least one resource acts on at least a portion of the at least one task to thereby perform the at least one task;

a third executable portion for monitoring the performance of the at least one task as one of the at least one task is performed at the level $L_i$, wherein monitoring comprises monitoring to determine an amount of time required to perform the task performed and thereafter projecting a completion time associated with the maintenance plan;

a fourth executable portion for comparing the projected completion time to the predetermined threshold time associated with the maintenance plan, wherein when the projected completion time is no greater than the predetermined threshold time another task of the maintenance plan is performed, monitored and compared at the level $L_i$ until the each of the at least one task of the maintenance plan has been performed;

a fifth executable portion for determining whether performance of the other tasks of the maintenance plan can be rescheduled such that the maintenance plan can be completed within the predetermined threshold time, wherein determining occurs when the projected completion time is greater than the predetermined threshold time;

a sixth executable portion for soliciting additional resources from a higher level $L_{i+1}$, wherein soliciting occurs when at least one resource cannot be rescheduled to execute the other tasks of the maintenance plan within the predetermined threshold time; and a seventh executable portion for allocating additional resources to level $L_i$, wherein said second executable portion thereafter reschedules the at least one resource at level $L_i$ to include the additional resources allocated from level $L_{i+1}$ to act on at least a portion of other of the at least one task to thereby perform the other of the at least one task.

9. A computer program product according to claim 8, wherein said sixth executable portion solicits additional resources from level $L_{x+1}$, wherein x=i, wherein soliciting repeatedly continues for x=x+1 until at least one of x=n and a level $L_x$ having additional resources available to allocate is discovered, and wherein said seventh executable portion allocates additional resources to level $L_x$ from level $L_{x+1}$, wherein allocating repeatedly continues for x=x−1 until x=i.

10. A computer program product according to claim 8, wherein said first executable portion further recreates the at least one maintenance plan to reduce a demand on the at least one resource to perform the at least one task when no additional resources are available to allocate, wherein the demand is reduced such that the projected completion time is no greater than the predetermined threshold time.

* * * * *